United States Patent
Lo et al.

(10) Patent No.: US 7,869,535 B2
(45) Date of Patent: Jan. 11, 2011

(54) METHOD, SYSTEM AND APPARATUS FOR PHASE CONTROL OF TRANSMIT DIVERSITY SIGNALS

(75) Inventors: Wai Hon Lo, Piscataway, NJ (US); Dilek Barlas, Bedford, MA (US); Haim Harel, New York, NY (US); Kenneth Kludt, Bedminster, NJ (US); Yair Karmi, Bridgewater, NJ (US)

(73) Assignee: Magnolia Broadband Inc., Warren, NJ (US)

( * ) Notice: Subject to any disclaimer, the term of this patent is extended or adjusted under 35 U.S.C. 154(b) by 976 days.

(21) Appl. No.: 11/711,643

(22) Filed: Feb. 28, 2007

(65) Prior Publication Data

US 2008/0205551 A1 Aug. 28, 2008

(51) Int. Cl.
H04B 7/02 (2006.01)
H04L 1/02 (2006.01)
(52) U.S. Cl. .............. 375/267; 375/299; 375/347; 375/260; 455/501; 455/504; 455/506; 455/101
(58) Field of Classification Search .............. 375/267, 375/299, 347, 260; 455/501, 504, 506, 101
See application file for complete search history.

(56) References Cited

U.S. PATENT DOCUMENTS

| | | | |
|---|---|---|---|
| 4,462,109 A | 7/1984 | Hughes | |
| 5,642,353 A | 6/1997 | Roy, III et al. | |
| 5,812,687 A | 9/1998 | Onetti et al. | |
| 5,832,044 A | 11/1998 | Sousa et al. | |
| 5,991,330 A | 11/1999 | Dahlman et al. | |
| 5,999,826 A | 12/1999 | Whinnett | |
| 6,185,440 B1 | 2/2001 | Barratt et al. | |
| 6,226,509 B1 | 5/2001 | Mole et al. | |
| 6,236,363 B1 | 5/2001 | Robbins et al. | |
| 6,330,294 B1 | 12/2001 | Ansbro et al. | |
| 6,343,218 B1 | 1/2002 | Kaneda et al. | |
| 6,392,988 B1 | 5/2002 | Allpress et al. | |

(Continued)

FOREIGN PATENT DOCUMENTS

EP  0 986 193  3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner*—Phuong Phu
(74) *Attorney, Agent, or Firm*—Pearl Cohen Zedek Latzer, LLP

(57) ABSTRACT

Embodiments of the present invention include a method and apparatus for modifying a transmit diversity signal by control of at least a relative parameter, for example, phase difference, in a first signal relative to at least one second signal using various switching modules or techniques. In some embodiments of the invention, the relative difference may be controlled by switching paths, or producing various degrees of relative difference by switching, activating or controlling multiple elements with various resolutions of the relative parameter, or by connecting elements by timing of switches.

37 Claims, 7 Drawing Sheets

U.S. PATENT DOCUMENTS

| | | | |
|---|---|---|---|
| 6,492,942 | B1 | 12/2002 | Kezys |
| 6,636,495 | B1 | 10/2003 | Tangemann |
| 6,704,370 | B1 | 3/2004 | Chheda et al. |
| 6,745,009 | B2 | 6/2004 | Raghothaman |
| 6,806,792 | B2 | 10/2004 | Penn |
| 6,810,264 | B1 | 10/2004 | Park et al. |
| 6,859,643 | B1 | 2/2005 | Ma et al. |
| 6,882,228 | B2 | 4/2005 | Rofougaran |
| 7,075,485 | B2 * | 7/2006 | Song et al. ............ 343/700 MS |
| 2003/0112880 | A1 | 6/2003 | Walton et al. |
| 2003/0222691 | A1 | 12/2003 | Dueme et al. |
| 2004/0048584 | A1 | 3/2004 | Vaidyanathan et al. |
| 2004/0085239 | A1 | 5/2004 | Ukena et al. |
| 2005/0059355 | A1 | 3/2005 | Liu |
| 2005/0143113 | A1 | 6/2005 | Lee et al. |

FOREIGN PATENT DOCUMENTS

| | | |
|---|---|---|
| EP | 1 282 242 | 2/2003 |
| EP | 1 282 244 | 2/2003 |
| EP | 1 284 545 | 2/2003 |
| EP | 1 262 031 | 5/2004 |
| GB | 2 353 437 | 2/2001 |
| JP | 09-238098 | 9/1997 |
| JP | 2000-151484 | 5/2000 |
| WO | WO 97/24818 | 7/1997 |
| WO | WO 00/79701 | 12/2000 |
| WO | WO 01/69814 | 9/2001 |
| WO | WO 03/090386 | 10/2003 |
| WO | WO 2004/045108 | 5/2004 |
| WO | WO 2005/081444 | 9/2005 |

OTHER PUBLICATIONS

"Phase Shifter 1.0-1.9 GHz", Tyco Electronics, Miacom, MAPCGM0001-DIE, 903215, pp. 1-5.

Liam Devlin, "The Design of Integrated Switches and Phase Shifters", pp. 1-15.

Adler et al., "Broadband Switched-Bit Phase Shifter Using All-Pass Networks", IEEE MTT-S Digest, 1991, pp. 265-268.

"Phase Shifter Design Tutorial", RF, RFIC & Microwave Theory Design, pp. 1-12.

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

International Search Report for International Application No. PCT/US08/02403 mailed Jul. 25, 2008.

* cited by examiner

METHOD, SYSTEM AND APPARATUS FOR PHASE CONTROL OF TRANSMIT DIVERSITY SIGNALS

FIELD OF THE INVENTION

The present invention relates to wireless transmit diversity, and in particular to methods, systems and apparatus for control of transmit diversity in wireless systems.

BACKGROUND OF THE INVENTION

Wireless transmission systems may use transmit diversity, whereby signals are transmitted to a receiver using a plurality of transmit antennas. Typically, such transmit diversity systems are intended to increase network capacity and reduce the signal degradation caused by multi-path and fading. A phase difference between signals transmitted by two or more antennae may be calculated according to a modulation or perturbation algorithm, and implemented using a programmable phase shifter. There is a need for an improved implementation of controlling the phase difference between two or more transmit diversity signal paths.

SUMMARY OF EMBODIMENTS OF THE INVENTION

Embodiments of the present invention include a method and apparatus for modifying a transmit diversity signal by control of at least a relative parameter, for example, phase difference, in a first signal relative to at least one second signal using various switching modules or techniques. In some embodiments of the invention, the relative difference may be controlled by switching paths, or producing various degrees of relative difference by switching, activating or controlling multiple elements with various resolutions of the relative parameter.

The information may be communicated in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets. A packet may comprise any suitable packet, such as a General Packet Radio Service (GPRS) packet, an Enhanced Data for GSM Evolutions (EDGE) packet, or other suitable packet.

Network 10 may utilize communication protocols and technologies to provide the communication sessions. Examples of communication protocols and technologies include those set by the Institute of Electrical and Electronics Engineers, Inc. (IEEE) 802.xx standards, International Telecommunications Union (ITU-T) standards, European Telecommunications Standards Institute (ETSI) standards, Internet Engineering Task Force (IETF) standards, or other standards.

Devices of network 10 may use any suitable multiple access technology, for example, a code division multiple access (CDMA) technology. According to one embodiment, network 10 may operate according to a CDMA 2000 telecommunications technology that uses a single CDMA channel. As an example, a CDMA 2000 high rate data packet technology, such as the Evolution Data Only (EvDO) technology may be used.

Network 10 may comprise any suitable communication network. A communication network may comprise all or a portion of a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, other suitable communication link, or any combination of the preceding.

A component of network 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF ILLUSTRATED EMBODIMENTS OF THE PRESENT INVENTION

Embodiments of the present invention may allow for transmit diversity control by using a system that uses selection of phase parameters to enhance the system throughput, by requiring less repetitions or supporting higher data rate and larger, more efficient data packets. Embodiments of the present invention may allow for a system with reduced power consumption by providing control of the power ratio, or relative amplitude, the relative phase, or both, of output signals. Embodiments of the present invention may allow for improvement of power efficiency, optimized received signal quality, or both, by maintaining high radio frequency (RF) linearity through an air interface with a defined power range. Embodiments of the present invention may allow for improvement of the effects of switching transients by providing improved phase shift schemes. Embodiments of the present invention may allow for improvement of routing by providing improved switch configurations.

Embodiments of the invention may provide for improved performance, measured, for example, in terms of the power the unit is required to transmit for the receiver to receive acceptable signal quality, the number of errors in the transmission, higher throughput and improved coverage resulting from possibly improved selection of diversity control parameters.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Embodiments of the present invention and its advantages are best understood by reference to FIGS. 1 through 11, like numerals being used for like and corresponding parts of the various drawings; however, it will be understood that the figures depict examples and embodiments only and do not limit the scope of the present invention.

Figure 1:
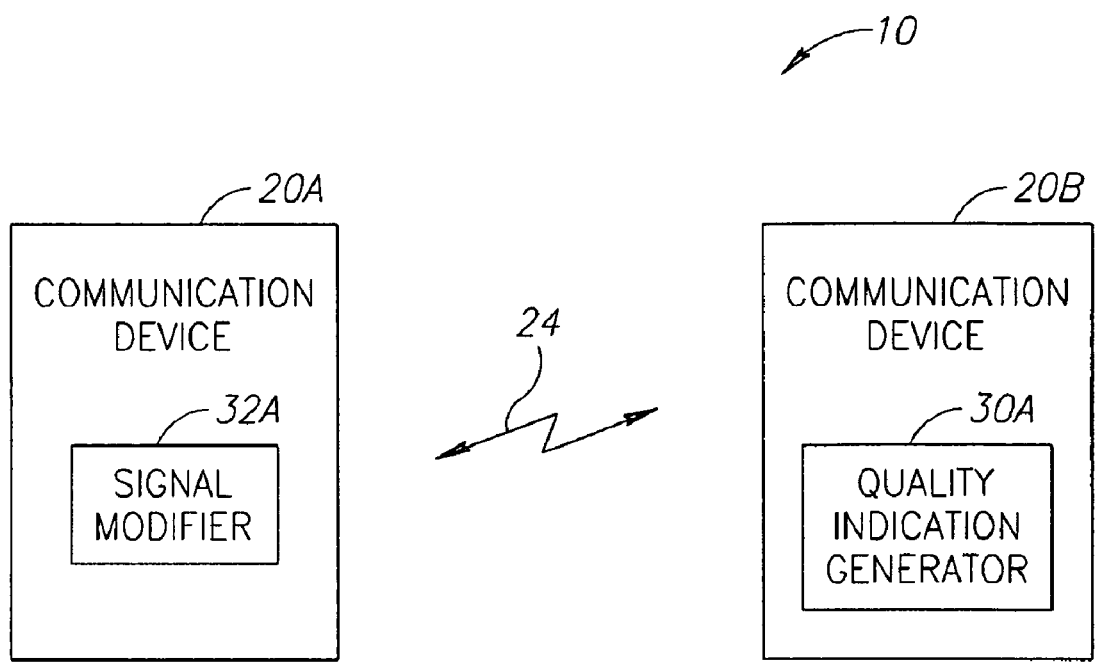
FIG. 1 is a schematic block diagram of a communication network according to an embodiment of the present invention that includes one or more transmitting communication devices and one or more receiving communication devices that communicate via a wireless link.

FIG. 1 is a block diagram illustrating a communication network 10 according to an embodiment of the present invention that includes a modifying communication device 20a that that adjusts a nominal value of a transmit diversity parameter. According to the embodiment, modifying communication device 20a may compute a diversity parameter that is used to control the power, phase, or both, of transmit diversity for a signal transmitted from communication device 20a to receiving communication device 20b. Modifying communication device 20a may adjust a nominal value of transmit diversity parameter based on the adjustment of the phase, power, or both parameters.

According to the illustrated embodiment, network 10 may operate to provide services such as communication sessions. A communication session may refer to an active communication between endpoints, measured from endpoint to endpoint. Information is communicated during a communication session. Information may refer to voice, data, text, audio, video, multimedia, control, signaling, other information, or any combination of the preceding.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, a removable media storage, any other suitable data storage medium, or a combination of any of the preceding.

Communication network 10 may include one or more modifying communication devices 20a and one or more communication devices 20b that communicate via a wireless link 24. Either or both of communication devices 20a or 20b may be any device operable to communicate information via signals with one or more other communication devices. For example, communication device 20a or 20b may comprise a subscriber unit or a base station. A subscriber unit may comprise any device operable to communicate with a base station, for example, a personal digital assistant, a cellular telephone, a mobile handset, a computer, or any other device suitable for communicating signals to and from a base station. A subscriber unit may support, for example, Session Initiation Protocol (SIP), Internet Protocol (IP), or any other suitable communication protocol.

A base station provides a subscriber unit access to a communication network that allows the subscriber unit to communicate with other networks or devices. A base station typically includes a base transceiver station and a base station controller. The base transceiver station communicates signals to and from one or more subscriber units. The base station controller manages the operation of the base transceiver station.

Either or both of communication devices 20a or 20b may include one or more antenna elements, where each antenna element is operable to receive, transmit, or both receive and transmit a signal. Multiple antenna elements may provide for a separation process known as spatial filtering, which may enhance spectral efficiency, allowing for more users to be served simultaneously over a given frequency band.

A communication link between communication devices 20a and 20b such as wireless link 24 may be a radio frequency link that is cellular in network organization. Wireless link 24 may be used to communicate a signal between communication devices 20a and 20b.

As described more fully below, according to embodiments of the present invention, modifying communication device 20a may include a signal modifier 32a that modifies one or more signals. Signal modifier 32a may then modify the transmit signal in accordance with selection of phase, power, or both, diversity parameters.

According to one embodiment of the invention, modifying a signal may refer to modifying a signal feature. A transmission signal feature, or in some embodiments of the invention, a transmit diversity parameter, may refer without limitation to any feature of the transmission, for example, relative phase, relative amplitude, relative power, absolute power, frequency, timing, other suitable signal feature that may be modulated, or any combination of the preceding. Relative phase may refer to the phase difference between the phase of a first signal of a first transmit antenna element and the phase of a second signal of a second transmit antenna element. Relative power may refer to the ratio between the power of a first signal of a first transmit antenna element and the power of a second signal of a second transmit antenna element, which ratio may be defined on a linear or logarithmic scale. Relative amplitude may refer to the ratio between the amplitude of a first signal of a first transmit antenna element and the amplitude of a second signal of a second transmit antenna element. Absolute power may refer to the total power transmitted by all antennas of modifying communication device 20a. According to one embodiment, modifying a signal may be described as adjusting a nominal value of a transmit diversity parameter. As described more fully herein, according to an embodiment of the invention, adjustment of a transmit diversity parameter may comprise selecting phase diversity parameters, selecting power diversity parameters, or both.

A modifying communication device 20a calculates transmit diversity parameters for use in transmitting across wireless link 24. Modifying communications device 20a may modify transmit diversity parameters for transmission to receiving communication device 20b using phase diversity parameters, power diversity parameters, or both.

In some embodiments of the device, modifying communication device 20a may include a transmit signal control and a signal modifier. Diversity parameter generator 30 may generate parameters for controlling transmit diversity of modifying communication device 20a. The parameters may be generated by any suitable manner, for example, based on feedback from the receiving communication device 20b, actual environmental conditions at the modifying communication device 20a, one or more performance parameters measured at modifying communication device 20a, or other indications. Signal modifier 32a may modify a pre-transmission signal in accordance with one or more transmit diversity parameters obtained from diversity parameter generator 30.

Alterations or permutations such as modifications, additions, or omissions may be made to communication network 10 without departing from the scope of the invention. Additionally, operations of communication network 10 may be performed using any suitable logic comprising software, hardware, other logic, or any suitable combination of the preceding.

Figure 2:
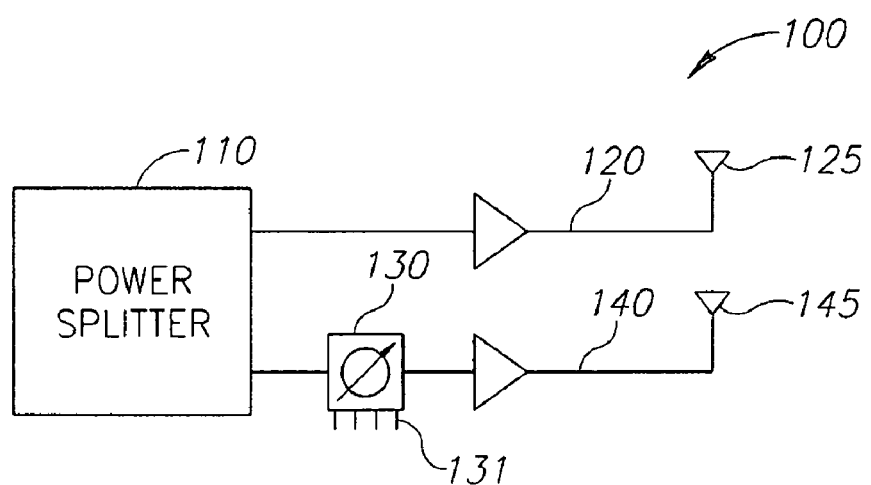
FIG. 2 is a schematic block diagram of a transmit diversity signal control device according to an embodiment of the present invention.

FIG. 2 is a schematic block diagram of a transmit signal control module 100 according to an embodiment of the invention. An RF signal may be received at the input of power splitter 110 and split suitably into at least two signals having a desired power ratio. A first signal may be a reference signal and may be transmitted on a first channel 120 via antenna 125. A second, or relative, signal may be modified in accordance with a transmit diversity scheme. The signal may be modified, for example, by controlling its phase, thereby producing a relative phase difference between the second signal and the first, reference signal. In the depicted exemplary embodiment of the invention, a programmable phase shifter 130 may be programmed, for example, by digital input 131, to produce a phase shift, thereby producing a difference between the second signal and the first, or reference, signal. Other embodiments are possible, for example, producing a relative amplitude difference, or any other diversity parameter, or any combination of diversity parameters. The second, or relative, signal may be transmitted on a second channel 140 via antenna 145. Phase shifter 130 may be able to shift the phase of the relative signal on channel 140 by any programmed amount from 0° to 360°, relative to reference channel 120.

In some embodiments, transmit signal control module 100 may comprise at least part of signal modifier 32a depicted in FIG. 1, however, it will be noted that other configurations for the signal modifier 32a are possible and within the scope of the invention.

Alterations or permutations such as modifications, additions, or omissions may be made to transmit signal control module 100 without departing from the scope of the invention. For example, transmit signal control module 100 may have more, fewer, or other sub-modules. Additionally, operations of transmit signal control module 100 may be performed using any suitable logic comprising software, hardware, or any suitable combination of the preceding.

Figure 3A:
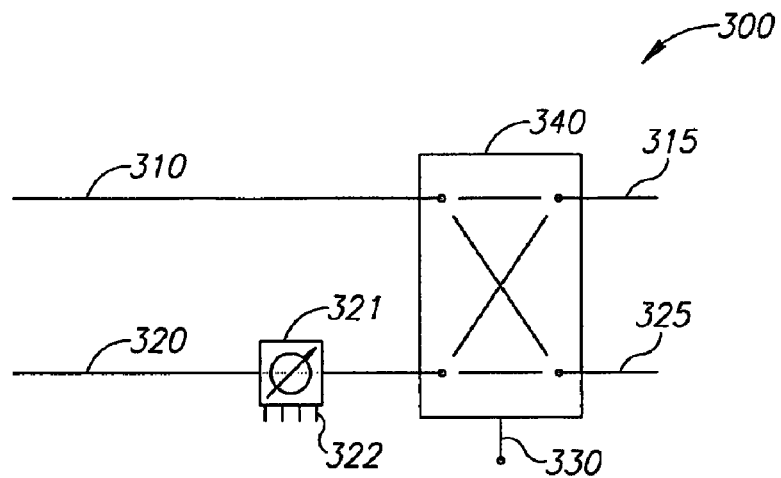
FIGS. 3A, 3B and 3C are schematic block diagrams of embodiments of the present invention including a crossover switch module.

FIG. 3A is a block diagram of a phase shifter device 300 in accordance with embodiments of the present invention. In one embodiment, a phase shifter device 300 of a transmit diversity system may be a dual channel device. A reference channel may contain no phase shifter, and the reference signal may be directed to a first input port of crossover switch 340. A relative channel 320 may include phase shifter 321 programmable, for example, by digital inputs 322 and the relative signal may be directed to a second input port to crossover switch 340. Crossover switch may have a control 330 that places it in a first or normal state, in which the signal on the first input port is directed to first output port 315 and signal on the second input port may be directed to the second output port 325, or a second or crossed state, in which the signal on the first input port is directed to second output port 325 and signal on the second input port may be directed to the first output port 315. Control 330 may be, for example, a one-bit signal, where a 0 or low produces a normal state of crossover switch 330 and a 1 or high produces a crossed state. Various implementations and configurations of crossover switch 340 are possible.

Although the above description addresses an embodiment having two channels, it will be recognized that some embodiments may include any number of channels. In such cases, the switching arrangement described above may be implemented using a matrix, and one or more of the relative channels may include phase shifting elements. In a variant of such a more-than-two channel embodiment, the dual channel configuration may be an element providing a building block to build a multi-channel configuration. Therefore, a three channel configuration, for example, may consist of a dual-channel element and a third separate channel; a four-channel configuration may consist of two dual channel elements or one dual channel element and two separate channels, etc.

According to embodiments of the invention, use of crossover switch 340 may enable use of a phase shifter 321 for producing a phase shift between 0° and 180°. Accordingly, when a phase shift of 0° and 180° is desired, the crossover switch may be in a normal state, and when a phase shift of 0° to −180° is desired, the crossover switch may be placed in a crossed state. It will be understood that in some embodiments of the invention, the power splitter may reverse its outputs when a phase shift of 0° to −180° is desired so that the power levels remain appropriate.

Figure 3B:
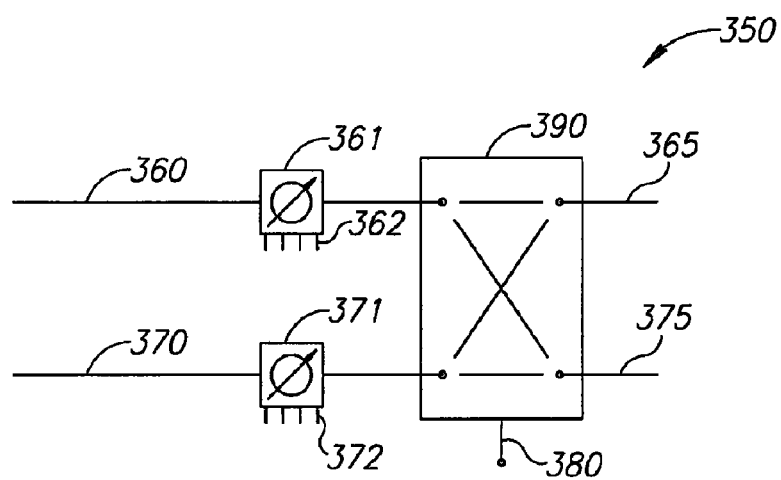

FIG. 3B is a block diagram of a phase shifter device 350 in accordance with embodiments of the present invention. In one embodiment, a phase shifter device 350 of a transmit diversity system may be a dual channel device. A reference channel may contain a first or positive phase shifter 361 programmable, for example, by digital inputs 362, and the reference signal may be directed to a first input port of crossover switch 390. A relative channel 370 may include a second or negative phase shifter 371 programmable, for example, by digital inputs 372 and the relative signal may be directed to a second input port to crossover switch 390. Crossover switch may have a control 380 that places it in a first or normal state, in which the signal on the first input port is directed to first output port 365 and signal on the second input port may be directed to the second output port 375, or a second or crossed state, in which the signal on the first input port is directed to second output port 375 and signal on the second input port may be directed to the first output port 365. Control 380 may be, for example, a one-bit signal, where a 0 or low produces a normal state of crossover switch 380 and a 1 or high produces a crossed state. Various implementations and configurations of crossover switch 390 are possible.

According to embodiments of the invention, use of crossover switch 390 may enable use of phase shifters for producing a total maximum phase shift of 180°. For example, each of phase shifters 361 and 371 may produce a phase shift between 0° and 90°. Accordingly, when a phase shift of 0° and 180° is desired, the crossover switch may be in a normal state, and when a phase shift of 0° to −180° is desired, the crossover switch may be placed in a crossed state. It will be understood that positive phase shifter 361 may have a maximum phase shift of any value from 0° to 180° in a positive direction, called α, and a negative phase shifter 371 may have maximum phase shift of any value from 0° to 180° minus α, in a negative direction. For a range of exactly 360 degrees, the range of the second phase shifter should be 180° minus α.

It will be understood that implementations of the invention using a crossover switching module may require modifications or additions to the power splitter module to ensure that crossing the channels to produce the desired phase difference does not result in undesired alterations to the power levels of the signals on the channels. Thus, in some embodiments of the invention, the power splitter may be programmed to reverse or provide complements of its outputs when the crossover switch is in a crossed state, for example, when a phase shift of 0° to −180° is desired, so that the power levels are not reversed. Alternately, in some embodiments of the invention, there may be a second crossover switching module (not shown) placed between the output of the power splitter and the transmit channels, e.g., 310 and 320 in FIG. 3A, 360 and 370 in FIG. 3B, which crossover switching module may be triggered by the same event or signal that triggers the first crossover switch 340 or 390.

Using the configuration of FIG. 3A or 3B, the system complexity of a dual channel diversity device may be reduced by swapping between two channels using crossover switch to achieve a phase shift of 0° to 360°.

Figure 3C:
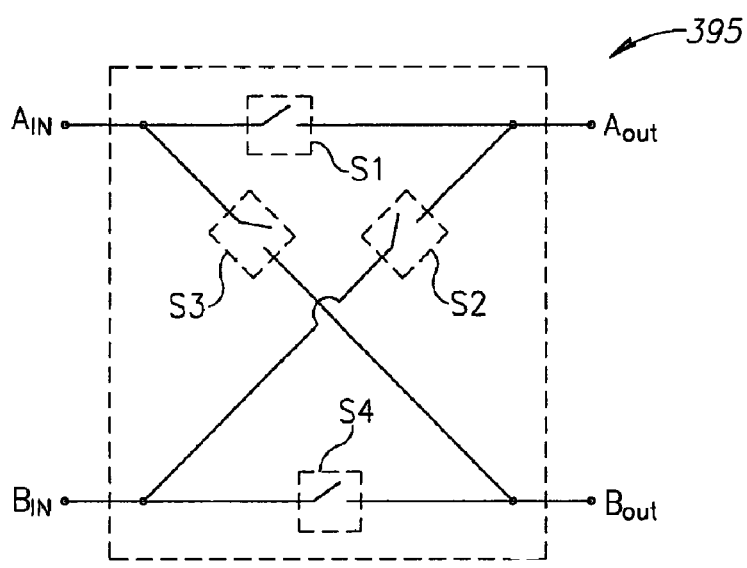

It will further be understood that the crossover switching module, for example, module 340 of FIG. 3A or module 390 of FIG. 3B may be implemented in any number of suitable ways, for example, using a single pole double throw switch, a crossover switch, or the figure-eight module of FIG. 3C.

FIG. 3C is a block diagram of a figure-eight switching module that may be used in connection with any switching requirement of the embodiments of the present invention. Crossing or swapping paths of two transmit diversity channels, for example reference and relative channels may be performed using the figure-eight module, in order to reduce a magnitude fluctuation from switch transitions in connection with embodiments of the present invention. Figure-eight switch 395 may further reduce the loss of a signal over the loss of a signal passing through another switch architecture, or further reduce the magnitude fluctuation from switching, or both. Signals may be received at channel A input $A_{IN}$ and channel B output $B_{IN}$. Any of the four switches of this embodiment, switch one (S1), switch two (S2), switch three (S3), or switch four (S4), may be operated independently or together in any combination. Switch S1 together with switch S4 may be referred to as buddy switches. Similarly, switch S2 together with switch S3 may be referred to as buddy switches. Each pair of buddy switches may be activated independently or together, for example, at a predefined delay from each other. In one embodiment of the invention, the "figure-eight" configuration may be driven to provide a make-before-break effect, that is, at least one switch of each buddy pair is always conducting, and there may be a transition period during which both of each pair of buddy switches are conducting. Timing of make-before-break signal timing may be done as described below with reference to FIGS. 7A and 7B, below. The connections of either buddy switches may not share common node points within the pair, which may allow for one switch to be opened or closed without affecting the state of another switch. Any switch configuration of this embodiment may be used to provide a relative phase between channel A output $A_{OUT}$ and channel output B output $B_{OUT}$.

In an embodiment, the switches of the figure-eight configuration may be operated in a sequence. For example, switch S1 may be connected to provide a phase to a signal. Switch S4 may be prepared to set a phase state prior to being switched into the signal path, and this advanced preparation may not interrupt the signal from connected switch S1. When a control signal is received by the figure-eight switch 395, only one connection may be switched to allow operation from the path controlled by switch S4, which may minimize the number of switches that may need to be switched in an active path. More than one control command may be received by figure-eight switch 395 to complete the switching.

In another embodiment, the buddy switches of figure-eight switch 395 may be controlled with a synchronous control signals for each of the sets of buddy switches. For example, switch S2 and switch S3 may be turned on or turned off with synchronous control signals or a common control signal. In this embodiment, no signal would need to be sent in advance, which may reduce the number of control signal, and may reduce the control complexity. It will be recognized that figure-eight switch 395 may be used alone or together with other switch configurations.

Figure 4:
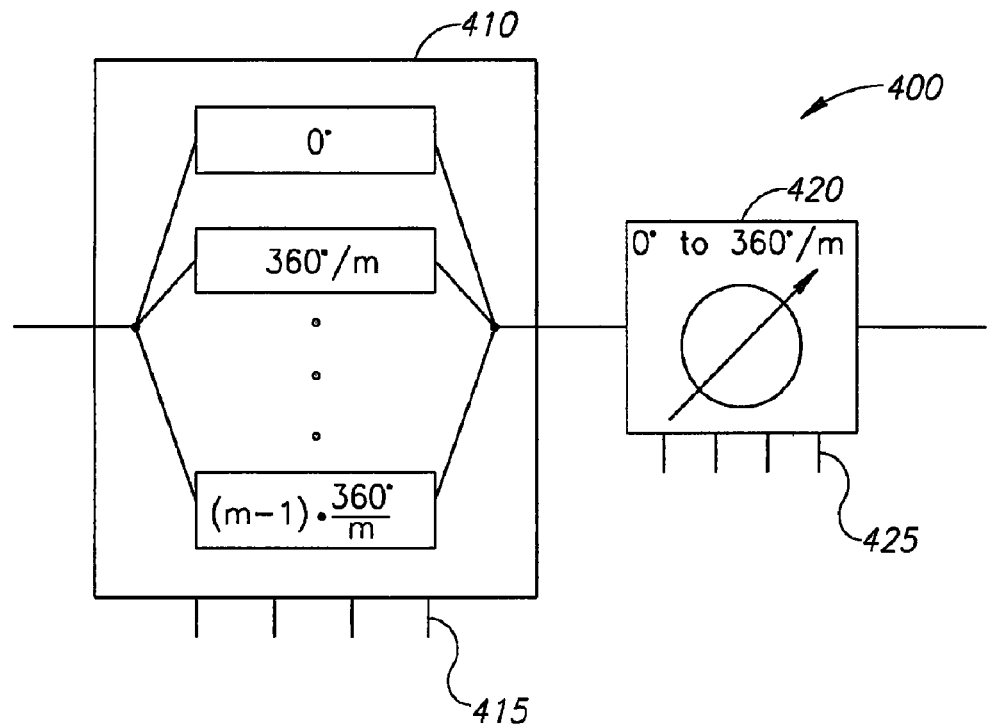
FIG. 4 is a schematic block diagram of a diversity signal control device having a coarse phase selection module and a fine phase selection module in accordance with embodiments of the present invention.

FIG. 4 is a schematic block diagram of a phase shifting module 400. In one embodiment of the invention, phase shifting module 400 of a transmit diversity system may be a combination of coarse phase selection 410 and fine phase selection 420. Coarse phase selection block 410 may include m coarse phase adjusters, which may, for example, be fixed phase shifters, each providing n×360°/m for n=0 to m−1. Therefore, for example, if m=3, coarse phase selection block 410 may include three fixed phase shifters, a first producing 0° phase shift, a second producing 120° phase shift, and a third producing 240° phase shift. A phase selection device may be selected by coarse phase selection input 415. Fine phase selection block 420 may be a programmable phase shifter that may include a single programmable phase shift element that may be capable of shifting phase continuously or in fine phase increments of, for example, 1, for a range of 0° and 360°/m, for example, 120°. Fine phase selection block 420 may be programmed or controlled by input 425. A signal passing serially through both coarse phase selection block 410 and fine phase selection block 420 may therefore be adjusted over a range of 0° to 360°. It will be recognized that variations are possible, for example, the order of blocks 410 and 420 may be reversed. Again, as noted above, some embodiments of the invention may include more than two segments having different resolutions, for example, a first stage of three phase shifters in 120° increments, a second stage of four phase shifters of 30° increments, and a third stage of thirty single-degree increments.

Figure 5:
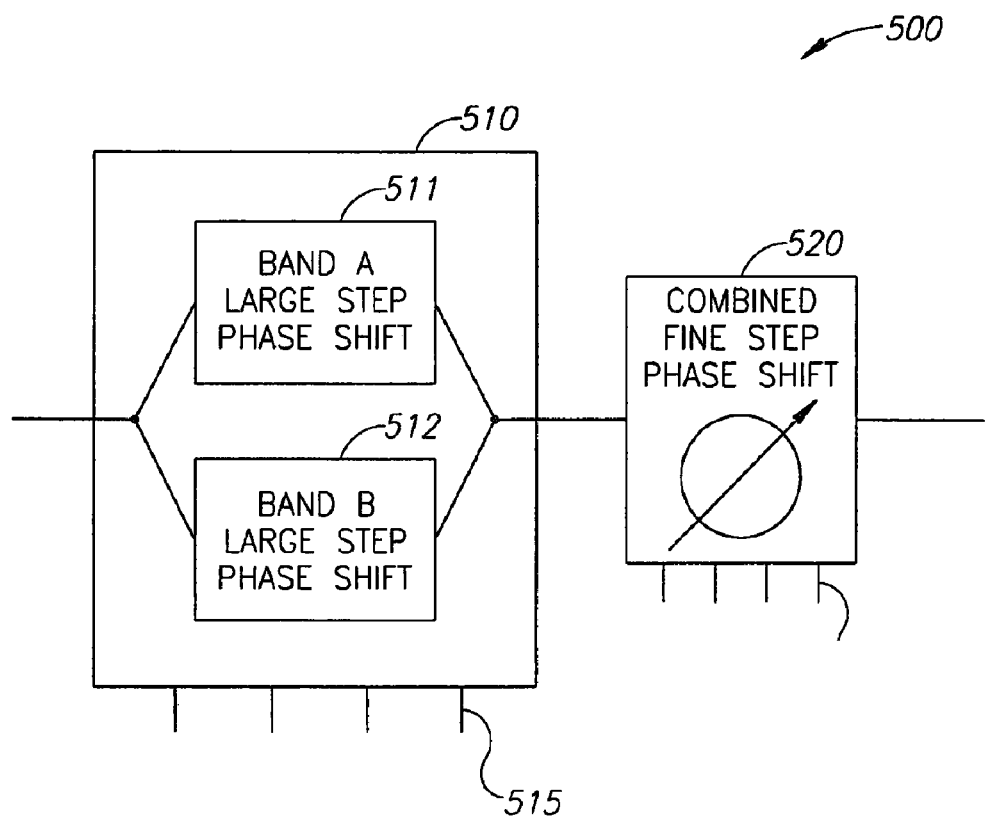
FIG. 5 is a schematic block diagram of a diversity signal control device having a band selection module and a fine phase selection module in accordance with embodiments of the present invention.

FIG. 5 is a block diagram of a phase adjust device 500 in accordance with embodiments of the present invention. In one embodiment, a phase shifter device of a transmit diversity system may be a combination 510 of selectable coarse or large-step phase selection devices having different bands, for example, Band A large-step phase shifter 511 and Band B large-step phase shifter 512, selectable by input 515. Phase adjust device 500 may further include in series at least one fine phase selection device 520 operable with either Band A or Band B and controllable via input 525. Accordingly, a first Band A coarse phase selection device 511 may be useful in a first type of communications transmission band and a second Band B phase selection device 512 may be useful in a second type of communications transmission band, and both may be connected to and operable with fine phase selection device 520. The configuration may provide for at least 360° of phase adjustment capability. For example, in one embodiment, Band A coarse phase selection device 511 may be configured to operate in a PCS band and Band B coarse phase selection device 512 may be configured to operate in a cellular band. Either Band A coarse phase selection device 511 or Band B coarse phase selection device 512, or a plurality of additional coarse phase selection devices may be configured to operate in other bands, for example UMTS, GSM, or any other mobile unit transmission band.

Figure 6:
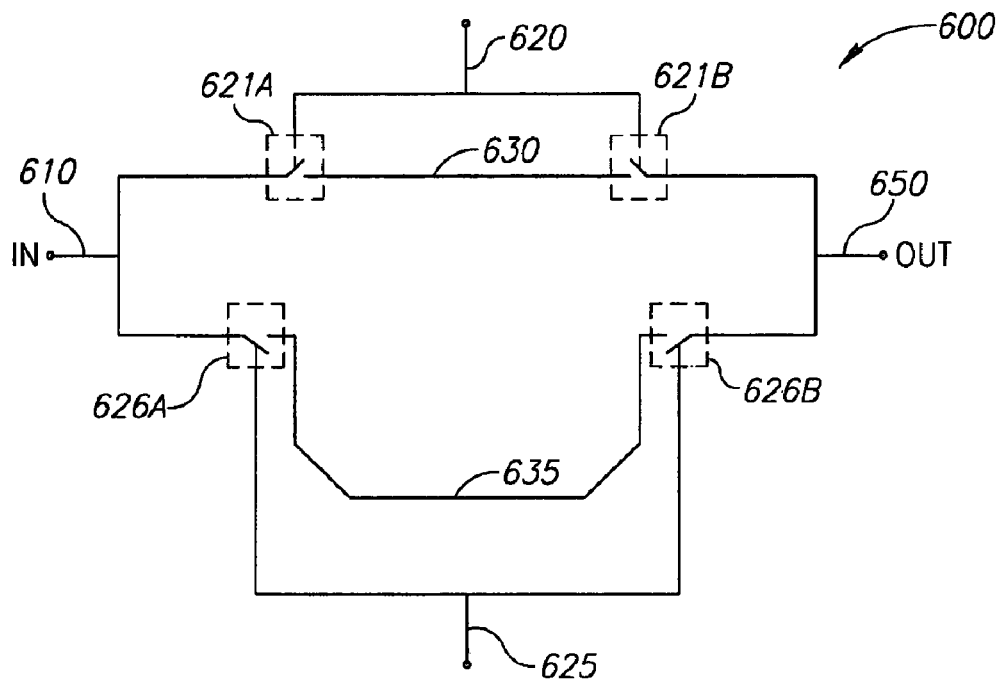
FIG. 6 is a schematic circuit diagram of a phase shifting element that may be used in accordance with embodiments of the present invention.

FIG. 6 is a block diagram of an embodiment of a phase shifting switching arrangement 600 in a relative channel of a transmit diversity system in accordance with embodiments of the present invention. A reference channel (not shown) may include no phase shifting element, and the depicted switching arrangement may be included in a relative channel to efficiently produce a phase shift. Relative channel may have input 610 where an RF signal is received. A switching signal at node 620 may control switches 621A and 621B, which direct RF signal through a reference path 630. A switching signal at node 625 may control switches 626A and 626B, which direct RF signal through a phase shift path 635. It will be understood that switches 621A, 621B, 626A and 626B may be implemented in any number of ways consistent with the teachings and scope of the present invention.

The timing of switching signals 620 and 625 may be designed in accordance with embodiments of the present invention to reduce transient magnitude fluctuations that may occur during switching. Transients may cause variations in the RF signal power from 1 dB to 20 dB, or higher changes. The cause of these variations may be from multiple factors, for example, from an overlap in the period of switches being closed and open, or from a phase difference between paths during and after switching, or from a plurality of switches switching together or nearly together to change the RF signal path, or from limitations of the switching speed of the switches, or from a combination of these or other effects. In one embodiment, timing of switching signals 620 and 625 may implement a make-before-break sequence where there may be synchronization between switches opening and closing, in order to minimize momentary disruptions of the RF path that may translate into magnitude fluctuations.

Figure 7A:
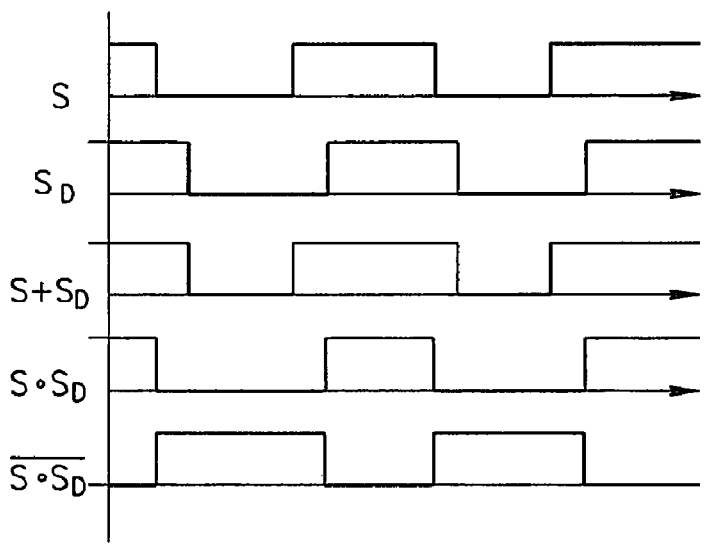
FIGS. 7A and 7B are a schematic signal timing diagram of signals and an schematic circuit diagram for implementing signal timing, which may be used for driving a phase shifting element in accordance with embodiments of the present invention.
Figure 7B:
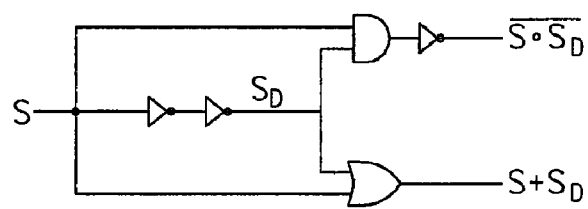

FIG. 7A is a schematic timing diagram of signals that may be provided to control switches of a phase shifting switching arrangement such as in FIG. 6 to provide a make-before-break sequence. A signal S may indicate that a change is desired, for example, from a reference path to a phase shift path, or vice versa. Based on signal S, switches 621 and 626 may be timed such that they are not simultaneously in an off state, or preferably, that there is some time when they are both on. For example, a signal $S_D$ may be provided at some delay D to signal S. Based on S and $S_D$, S+$S_D$ may be provided to switch port 620, and $\overline{S \cdot S_D}$ may be provided to switch port 625. FIG. 7B depicts a rudimentary implementation of providing S+$S_D$ and $\overline{S \cdot S_D}$ by introducing a delay and performing the required logical operations. It will be noted that the delay may be constructed in other ways, for example, by providing additional inverters to increase the time delay, etc.

Figure 8:
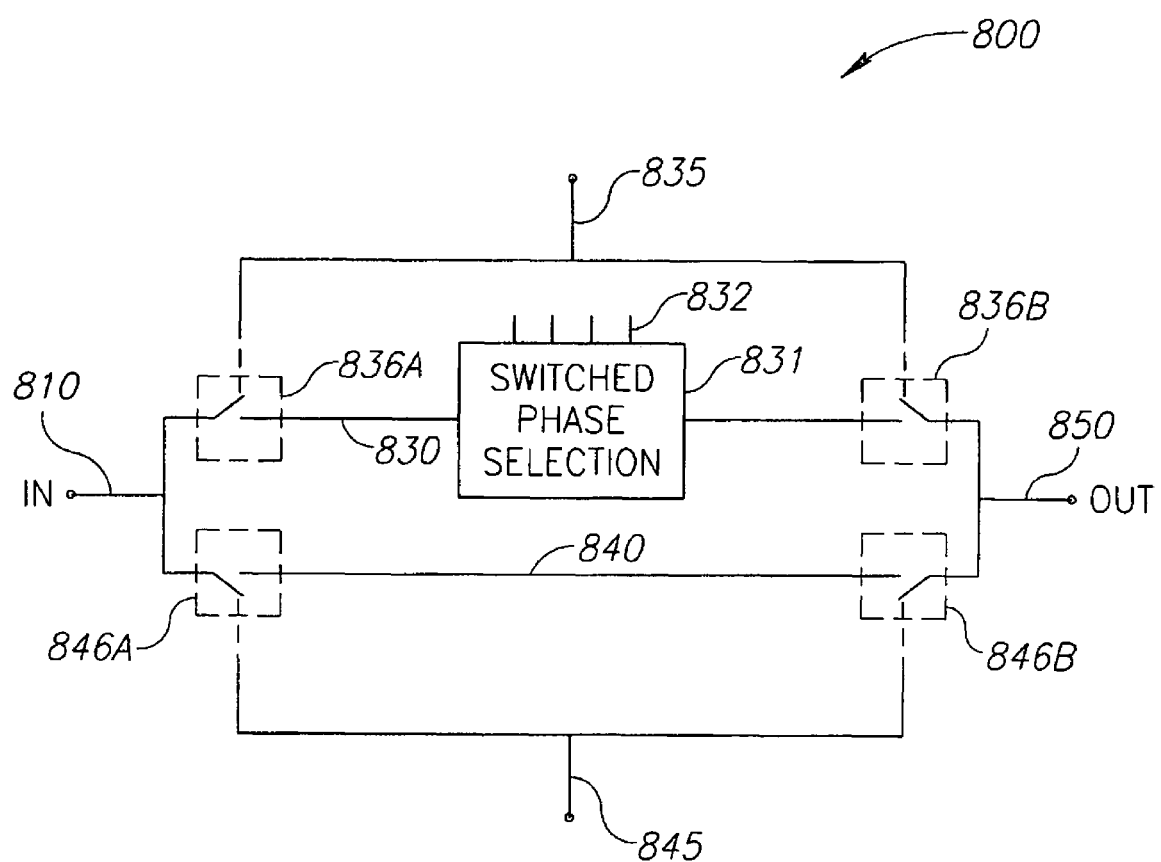
FIG. 8 is a schematic block diagram of a transmit diversity signal path including a switched phase selection module in accordance with embodiments of the present invention.

FIG. 8 is a block diagram of an embodiment of a switching arrangement 800 of the present invention for switching the phase of a transmit diversity signal. The arrangement may include an input port 810 where an input RF signal may be received. The signal may be directed to relative path 830 by input switches 836A and 836B, controlled by control signal at node 835, to a switched phase selection module 831, in which phase shift may be selected by data at input 832, or to bypass path 840, connected by switches 846A and 846B controlled by a control signal at node 845. Switched phase selection module may be a series of cascaded phase shift elements having different phase shifts, providing different degrees of resolution of phase shift, for example, 180°, 90°, 45°, 22.5°, 11.25°, and 5,625°, enabling phase shifting of 0° to 360° with resolution of 5.625°. Other implementations are possible. In operation, while the programming or control of switched phase selection is being performed, an alternate path may be connected to input and output ports instead of the relative path, for example, in order to reduce the combined transient magnitude fluctuation that may result from switching multiple cascaded switches, which may be used to implement the switched phase selection module 831. Control signals to nodes 835 and 845 may be complementary, or in an exemplary embodiment of the invention, may allow for a brief overlap transition period to ensure no simultaneous disconnection of both paths. Accordingly, in operation, initially, the bypass switches 846A and 846B may connect the alternate path 840, then the relative path 830 may be connected by switches 836A and 836B, then the switched phase selection module 832 may be programmed to a desired phase shift, and then the relative path switches 836A and 836B may be connected, and finally, the bypass switches 846A and 846B may be disconnected.

Some embodiments may include multiple bypass paths and each of them may carry different signal modifying elements, for example, phase shift elements having constant or non-zero phase shift, such as, for example, the median phase of the phase shifting element. A bypass path may have a programmable element having less resolution than the phase shifting element being bypassed. In some embodiments having multiple bypass paths, the particular bypass path may be chosen based on the effectiveness of improving the circuit performance (e.g., reducing the transient effect).

Figure 9:
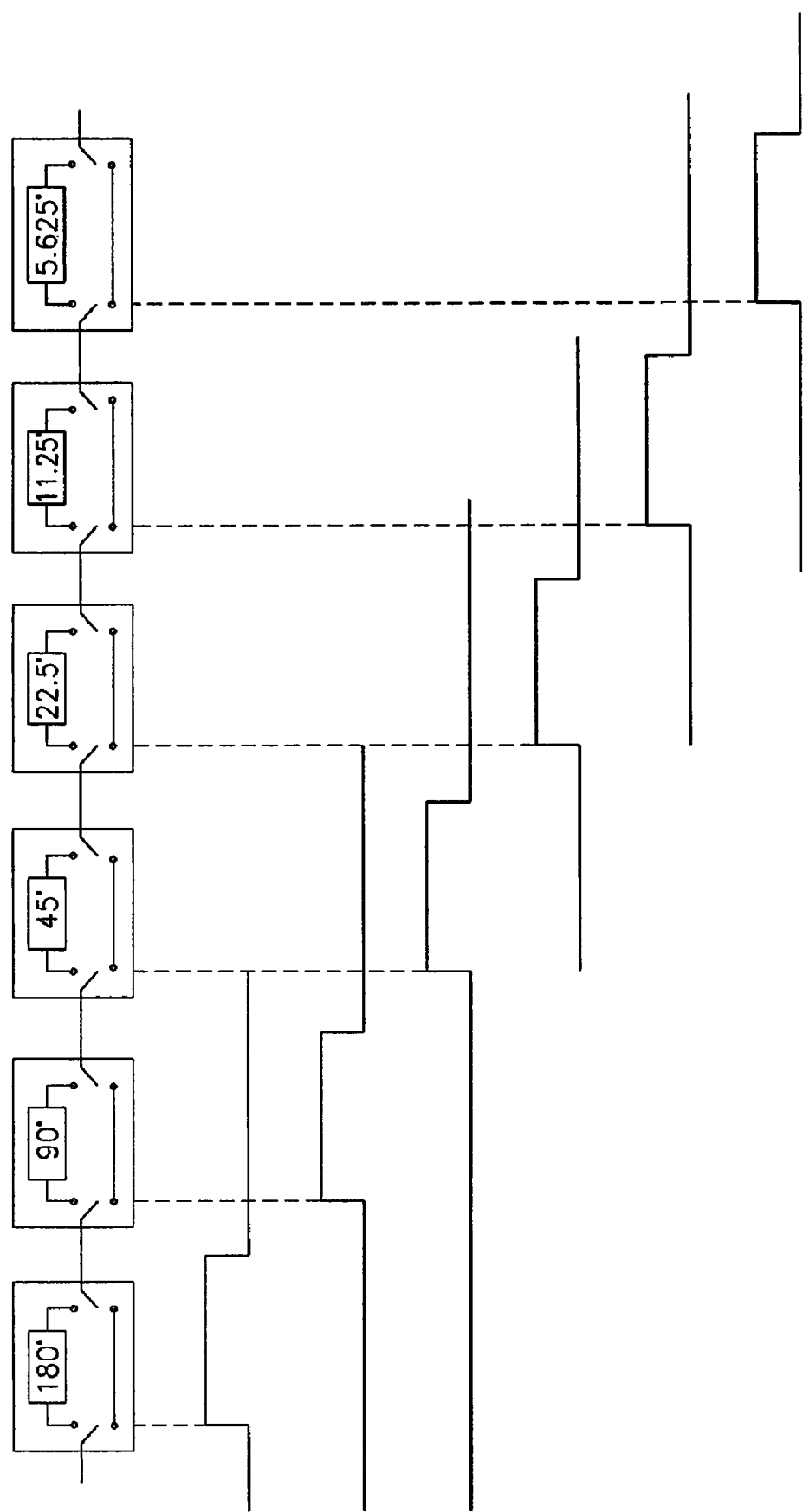
FIG. 9 is a schematic signal timing diagram of a sequence of signals that may be used to drive a switched phase selection module in accordance with embodiments of the present invention.

FIG. 9 is a schematic diagram of an embodiment of the invention including a schematic timing diagram for switched phase shifting in accordance with embodiments of the present invention. The switched phase selection module of the present invention may include a cascaded series of phase shift elements that may be independently be connected or bypassed by switches, for example, as depicted in FIG. 9. In one embodiment of the invention, the individual phase shift modules may be connected in series and connected sequentially with time delay between the selections, such that transients resulting from switching the cascaded switches may be reduced. In one embodiment of the invention, for each successive phase shift element, the internal switching may be synchronous. In another embodiment of the invention, the switching of each element may be driven as described with reference to FIGS. 6 and 7.

In another embodiment of the invention, rapid switching may be achieved by connecting adjoining phase shift modules using crossover switching modules such as those depicted in FIGS. 3A, 3B and 3C, rather than the single-pole double throw switches depicted in FIG. 9. Accordingly, a number of sequential phase shift modules may be inverted by crossing over the switches bracketing the sequence. In the present embodiment of the invention, the first phase shift module (180°) may be connected to the input side using a crossover switching module, and the last phase shift module (5.625°)

may be connected to the output side using a crossover switching module. Each of the intermediate phase shifting modules may also be connected to adjoining modules by crossover switching modules. Thus, there may constantly be two alternative and complementary paths formed, one of them being selected for transmitting the signal. Thus, for example, in the phase shift module configuration of FIG. 9, the data sequence 100000 represents activating the first phase shift module (180°) and bypassing the remainder, resulting in 180° phase shift. By crossing the state of the initial and ultimate crossover switches, the effective data sequence becomes 011111, resulting in phase shift of 174.375°. Thus, the effective pass/bypass state of all six phase shift modules may be changed by changing the state of two switching modules, whereas in the single-pole double throw embodiment of the invention, each of the modules would have to be switched separately. It will be recognized that this principle may be applied to any sequence of phase shifting modules that must be inverted. Thus, for example, changing 001011 to 010101 may similarly be performed by inverting the center four phase shift modules, rather than by individually switching each of the four center modules.

Figure 10:
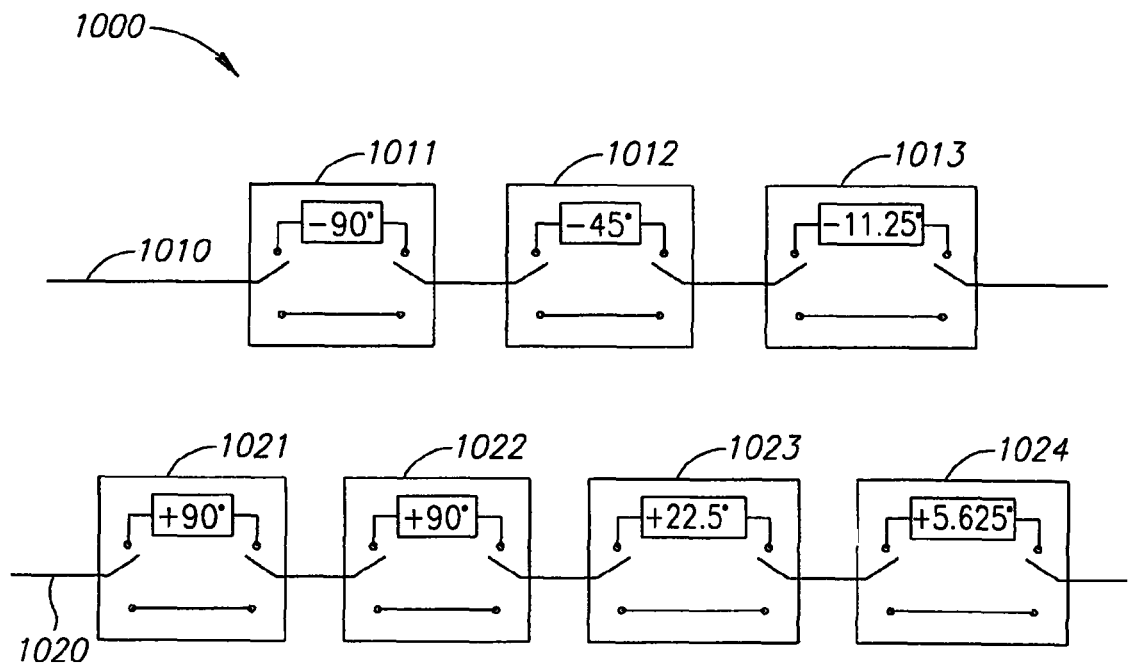
FIG. 10 is a schematic block diagram of a transmit diversity signal path including switched phase selection modules in accordance with embodiments of the present invention.

FIG. 10 is a block diagram 1000 of an embodiment of the switches of the present invention for switching the phase of a transmit diversity signal that may use a phase shifting device. Introducing a phase shift may be implemented, for example, using two channels 1010 and 1020, whereby switching between phases may, for example, be performed by switching some of the phase in the reference channel 1010 and some of the phase in the relative phase channel 1020. This may be done, for example, to reduce the combined magnitude attenuation effect of the switching of a plurality of cascaded switches. In this embodiment a first channel 1010 has phase select switches 1011, 1012 and 1013 and a second channel 1020 has select switches 1021, 1022, 1023 and 1024. When both channels are fed with signals from a common source, e.g. from a power splitter, this configuration may support transmit diversity control and may be combined with other embodiments of the invention. Additionally or alternatively, this configuration may be readily expanded to an embodiment including more than two channels, wherein each channel may have different switching elements and switching between phases may, for example, be performed by switching some of the phase in some or all of the channels.

Both sets of switches may be used by a phase shifting device to select the phase of a signal. By using phase shifting modules in both channels, the number of switches switching at any one time on any one channel may be reduced, thereby reducing the amount of magnitude fluctuation due to switching. In one embodiment, the switches in channel 1010 phase select switches 1011, 1012 and 1013 and channel 1020 select switches 1021, 1022, 1023 and 1024 may be synchronized. This synchronization may reduce the relative RF signal magnitude variation between the two channels during switching, for example, using sequential signal timing, as described with reference to FIG. 9, or make-before-break switching, as described with reference to FIG. 7A, or another suitable synchronization scheme.

The selection of phase shifts in each of first channel 1010 and second channel 1020 may provide for efficient switching. One channel may include some multiples of the smallest phase resolution desired, e.g., −11.25°, −45°, −90°, etc., while the other channel may include other multiples of the smallest phase resolution desired, e.g., 5.625°, 22.5°, 90°, etc. Accordingly, it will be noted that by independently selecting any combination of phase shifting elements 1011, 1012 and 1013 in first channel 1010, a first set of phase shifts may be provided, e.g., 0°, −11.25°, −45°, −56.25°, 90°, −101.25°, etc. It will be further noted that by independently selecting any combination of phase shifting elements 1021, 1022, 1023 and 1024 in second channel 1020, a second set of phase shifts may be provided, e.g., 0°, −5.625°, −22.5°, −28.125°, etc. Each of first and second sets may therefore include irregularly intervaled phase shifts, however, when taken together, the combination of first and second phase shifts on first and second channels is capable of producing any combination of phase shifts from 0° to 360°, e.g., 0°, −5.625°, −11.25°, −16.875, −22.5°, −28.125°, −33.75°, 39.375°, −45°, etc.

Figure 11:
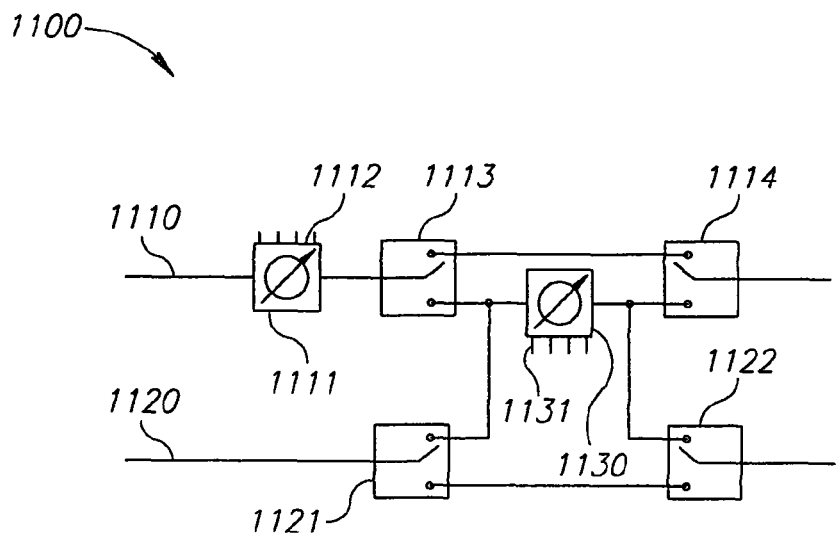
FIG. 11 is a schematic block diagram of a transmit diversity signal path including switched phase selection modules in accordance with embodiments of the present invention.

FIG. 11 is a block diagram of an embodiment 1100 of the switches of the present invention for switching the phase of a transmit diversity signal. Some of the switching between phases may, for example in a switch section with two channels, be performed by switching some of the phase in either channel. Input to a first channel 1110 may provide a signal to the programmable phase shifting device 1111, programmed by data input 1112. A second programmable phase shift device 1130, controlled by data input 1131, may be connected to switches 1113 and 1121 at its input and to switches 1114 and 1122 at its output. In a first mode of operation, when phase shifter 1130 is switched to be connected to the first channel and bypassed in the second channel, the phase shifts produced by phase shifting devices 1111 and 1130 are added. In a second mode of operation, the phase shifting device 1130 may be connected to the second path and bypassed by the first path.

In some exemplary embodiments of the invention, the phase shifting devices 1111 and 1130 may each be programmable phase shifting devices comprised of a plurality of independently selectable phase shifting elements having different phase resolutions. Thus, for example, first phase shifting device 1111 may have different resolution than second phase shifting device 1130. Thus, for example, in one embodiment of the invention, first phase shifting device 1111 may provide coarse phase shift with 90° resolution, for example, by including independently selectable 180° and 90° phase shifting elements, and second phase shifting device may provide fine phase shift between 0° and 45°, for example, by including independently selectable 22.5°, 11.25° and 5.625° phase shifting elements. Accordingly, the first phase shifting device 1111 may provide a coarse phase selection with 90° resolution, and the second phase shifting device 1130 may be used to provide ±45° adjustment, wherein from 0° to +45° may be provided by switching the phase shifting device 1130 to be connected to channel 1110, and wherein from 0° to −45° may be provided by switching the phase shifting device 1130 to be connected to channel 1120. In this manner phase shift cells may be included or excluded from either channel, and outputs in either channel may be reversed. It will be recognized that this programmable selection may be used with any switching method of the present invention.

It will be understood that in the description above, while mention is made of phase shifting element, any signal modifying element may be used, for example, an attenuator.

Embodiments of the invention may apply to any transmit diversity control method. It will be understood that the methods discussed herein may be integrated with any transmit diversity control algorithm. It will further be understood that the present invention may be implemented as a stand-alone processing module, or may be integrated into a transmit diversity control processor, algorithm, or signal path circuitry.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A transmitter device for transmitting a transmit diversity signal comprising:
   a first transmit channel;
   a second transmit channel;
   a common phase shifting element capable of producing a phase shift in a signal provided thereto; and
   a switching arrangement having at least two states, wherein in a first state, said switching arrangement connects said common phase shifting element to said first transmit channel, and in a second state said switching arrangement connects said common phase shifting element to said second transmit channel, wherein said first and second transmit channels are connected to simultaneously transmit respective signals.

2. The transmitter device of claim 1, further comprising timing circuitry associated with said switching arrangement that provides that said common phase shifting element is connected to at least one of said first and second channel at any time.

3. The transmitter device of claim 2, wherein said timing circuitry further provides that upon receiving a switching signal, said common phase shifting element is connected to both of said first and second channels for a predefined transition period.

4. The transmitter device of claim 1, further comprising:
   a second common phase shifting element capable of producing a phase shift in a signal provided thereto,
   wherein in the first state of said switching arrangement, said switching arrangement connects said second common phase shifting element to be in said second channel, and
   wherein in a second state of said switching arrangement, said switching arrangement connects said second common phase shifting element to be in said first channel.

5. The transmitter device of claim 1, wherein said switching arrangement is selected from the group consisting of a crossover switch, a banyan switch, a single pole double throw switch, a figure-eight switch arrangement, and a programmable matrix.

6. The transmitter device of claim 4, wherein said common phase shifting element and said second common phase shifting element are capable of producing phase shifts of respectively opposite polarity in signals provided thereto.

7. The transmitter device of claim 6 further comprising timing circuitry associated with said switching arrangement that provides that said common phase shifting element is connected to at least one of said first and second channel at any time.

8. The transmitter device of claim 7, wherein said timing circuitry further provides that upon receiving a switching signal, said common phase shifting element is connected to both of said first and second transmit channels for a predefined transition period.

9. The transmitter device of claim 1, wherein said common phase shifting element comprises:
   a coarse phase shifting element in series with a fine phase shifting element,
   wherein said coarse phase shifting element is capable of producing a selected plurality of coarse phase shift increments in a signal provided thereto, and
   wherein said fine phase shifting element is capable of producing a selected plurality of fine phase shift increments in a signal provided thereto, said coarse phase shift increments being larger than said fine phase shift increments.

10. The transmitter device of claim 9, wherein said coarse phase shifting element comprises a plurality of band-specific coarse phase shifting elements for a plurality of bands selectable based at least on a desired operational band.

11. The transmitter device of claim 1, further comprising a second phase shifting element in said first transmit path, said second phase shifting element capable of producing a phase shift in said first transmit signal.

12. The transmitter device of claim 11, wherein said second phase shifting element is a coarse phase shifting element capable of producing a phase shift selected from a plurality of phase shifts having coarse intervals therebetween, and said common phase shifting element is a fine phase shifting element capable of producing a phase shift selected from a plurality of phase shifts having fine intervals therebetween, said coarse phase shift intervals being larger than said fine phase shift intervals.

13. The transmitter device of claim 11, wherein said second phase shifting element is a band-specific phase shifting element capable of producing a phase shift selected from a plurality of phase shifts specific to a selected one of a plurality of bands having coarse intervals therebetween, and said common phase shifting element is a fine phase shifting element capable of producing a phase shift selected from a plurality of phase shifts having fine intervals therebetween, said fine phase shifts common for said plurality of bands.

14. The transmitter device of claim 1, further comprising a bypass switching arrangement associated with said common phase shifting element, said bypass switching arrangement capable of selectively bypassing said common phase shifting element while said common phase shifting element is programmed.

15. The transmitter device of claim 14, further including timing circuitry associated with said bypass switching arrangement that provides that at least one of said common phase shifting element and a bypass channel is connected to at least one of said first and second channel at any time.

16. The transmitter device of claim 15, wherein said common phase shifting element is programmable to provide a desired phase shift in a signal provided thereto, and said timing circuitry further provides that upon receiving a switching signal, said common phase shifting element is connected both of said first and second transmit channels for a predefined transition period.

17. The transmitter device of claim 1, wherein said common phase shifting element comprises a plurality of independently selectable phase shifting elements connected in series, and further comprising timing circuitry capable of providing control signals to said plurality of independently selectable phase shifting elements.

18. The transmitter device of claim 17, wherein said timing circuitry is capable of providing a timed sequence of control signals to said plurality of independently selectable phase shifting elements, respectively.

19. The transmitter device of claim 1, further comprising:
   a third transmit channel; and
   a second common phase shifting element, wherein said switching arrangement has additional states for selectively connecting said second common phase shifting element to said first, second or third transmit channel, wherein said third transmit channels is connected to transmit simultaneously with said first and second transmit channels.

20. A method of producing a transmit diversity signal comprising:
- determining a desired phase shift between first and second transmit signals;
- setting a common phase shifting element;
- for a first range of said desired phase shift, including said common phase shifting element in a first transmit path, and for a second range of said desired phase shift, including said common phase shifting element in a second transmit path; and
- simultaneously transmitting said first and second transmit signals.

21. The method of claim 20, including said common phase shifting element in a first transmit path or a second transmit path comprises setting a switching arrangement to a first or second state, in which said common phase shifting element is included connected to said first or second transmit path, respectively.

22. The method of claim 21, further comprising ensuring that said switching arrangement is connected to at least one of said first and second paths at any time.

23. The method of claim 22, wherein upon receiving a switching signal to change state of said switching arrangement, said common phase shifting element is connected to both of said first and second transmit paths for a predefined transition period.

24. The method of claim 20, further comprising:
- for said first range of said desired phase shift, including a second common phase shifting element in said second transmit path, and for said second range of said desired phase shift, including said second common phase shifting element in said first transmit path.

25. The method of claim 24, wherein said common phase shifting element and said second common phase shifting element are capable of producing phase shifts of respectively opposite polarity in signals provided thereto.

26. The method of claim 25, further comprising ensuring that said switching arrangement is connected to at least one of said first and second paths at any time.

27. The method of claim 26, wherein upon receiving a switching signal to change state of said switching arrangement, said common phase shifting element is connected to both of said first and second transmit paths for a predefined transition period.

28. The method of claim 20, wherein setting said common phase shifting element comprises:
- setting a coarse phase shifting element to select one of a plurality of coarse phase shifts having a coarse phase shifting interval therebetween, and
- setting a fine phase shifting element to select one of a plurality of fine phase shifts having a fine phase shifting interval therebetween, said coarse phase shift increments being larger than said fine phase shift increments.

29. The method of claim 28, wherein said coarse phase shifting element comprises a plurality of band-specific coarse phase shifting elements for a plurality of bands selectable based at least on a desired operational band.

30. The method of claim 20, further comprising setting a second phase shifting element, said second phase shifting element placed in said first transmit path and capable of producing a phase shift in said first transmit signal.

31. The method of claim 30, further comprising setting a third phase shifting element, said third phase shifting element placed in said second transmit path and capable of producing a phase shift in said second transmit signal.

32. The method of claim 31, wherein said second phase shifting element is a coarse phase shifting element capable of producing a selected coarse phase shift from a plurality of phase shifts having coarse phase shifting intervals therebetween, and said common phase shifting element is a fine phase shifting element capable of producing a fine phase shift from a plurality of phase shifts having fine phase shifting intervals therebetween, said coarse phase shifting intervals being greater than said fine phase shifting intervals.

33. The method of claim 31, wherein said second phase shifting element comprises a plurality of band-specific coarse phase shifting elements for a plurality of bands selectable based at least on a desired operational band, and said common phase shifting element is a fine phase shifting element capable of producing a selected phase shift from a plurality of phase shifts having a fine phase shifting interval therebetween, said coarse phase shifting intervals being greater than said fine phase shifting intervals.

34. The method of claim 20, further comprising selectively bypassing said common phase shifting element while said common phase shifting element is being programmed.

35. The method of claim 34, further comprising ensuring that at least one of said common phase shifting element and a bypass channel is connected to at least one of said first and second channel at any time.

36. The method of claim 35, wherein said common phase shifting element is programmable to provide a desired phase shift in a signal provided thereto, and further comprising connecting both of said first and second transmit channels for a predefined transition period while said common phase shifting element is programmed.

37. The method of claim 20, wherein said common phase shifting element comprises a plurality of independently selectable phase shifting elements connected in series and further comprising sequentially connecting said phase shifting elements with a predefined minimum time delay therebetween.

* * * * *